Jan. 7, 1936.                    W. BAUSCH                    2,026,606
MEANS FOR MAKING OPHTHALMIC LENSES
Filed March 31, 1933
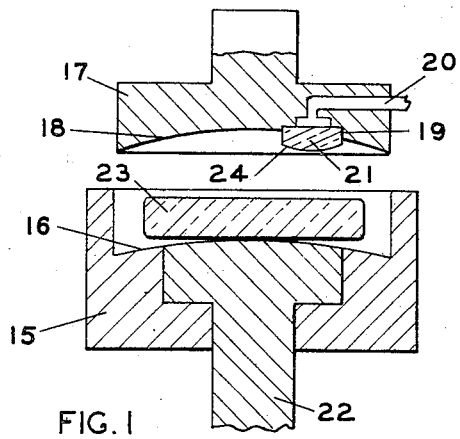
FIG. 1
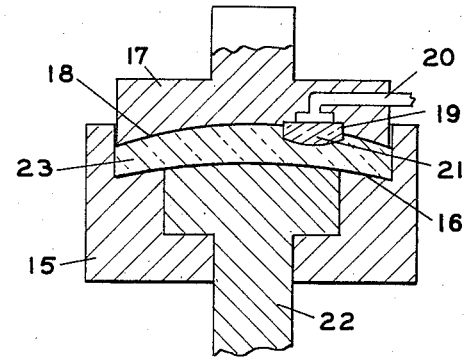
FIG. 2
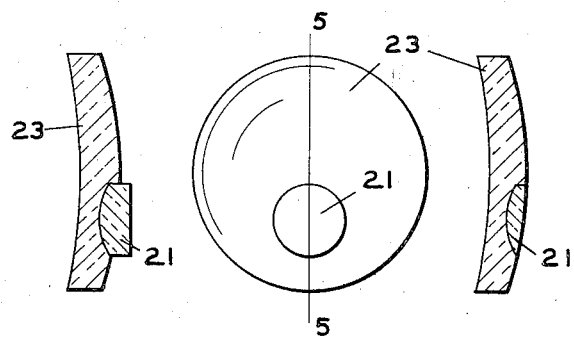
FIG. 3    FIG. 4    FIG. 5
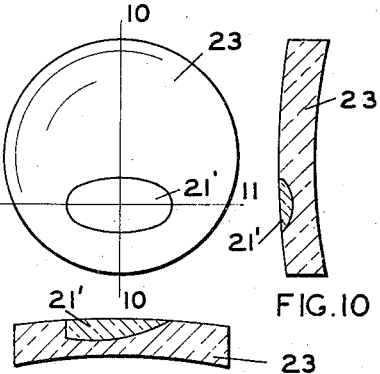
FIG. 9    FIG. 10
FIG. 11
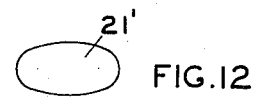
FIG. 12
FIG. 13
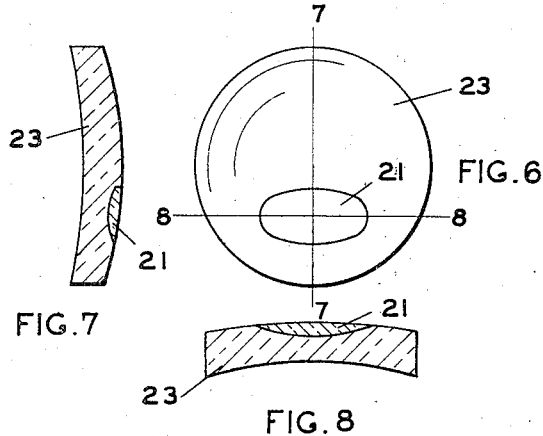
FIG. 6
FIG. 7
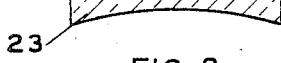
FIG. 8
WILLIAM BAUSCH
INVENTOR
BY *G. A. Ellestad*
ATTORNEY Patented Jan. 7, 1936

2,026,606

UNITED STATES PATENT OFFICE 2,026,606

MEANS FOR MAKING OPHTHALMIC LENSES

William Bausch, Rochester, N. Y., assignor to Bausch & Lomb Optical Company, Rochester, N. Y., a corporation of New York Application March 31, 1933, Serial No. 663,841

4 Claims. (Cl. 49—82.1)

This invention relates to a method and means for making ophthalmic lenses and more particularly it has reference to such types of lenses as are produced by fusing together two or more pieces of glass to provide multifocal lenses.

One of the objects of my invention is to provide an improved method and means for producing fused ophthalmic lenses. Another object is to provide a method and means for fusing a minor lens member to a major lens member and simultaneously forming one or more curved surfaces on the major lens member. A further object is to provide a method and means for making multifocal lenses in which the minor lens member is of prismatic form and has its prism base selectively positioned. Still another object is to provide a method and means for producing fused multifocal lens blanks with a minimum of labor. Other objects and advantages reside in certain novel features of construction, arrangement and combination of parts and in the method of constructing, arranging and combining the parts as will hereinafter be more fully described.

Referring to the drawing:

Figs. 1 and 2 are sectional views of my improved apparatus illustrating the method of producing a lens.

Fig. 3 is a sectional view of a lens blank as removed from the mold.

Fig. 4 is a front view of same after it has been surfaced.

Fig. 5 is a sectional view taken on line 5—5.

Fig. 6 is a front view of another lens produced by my method and apparatus.

Fig. 7 is a sectional view taken on line 7—7.

Fig. 8 is a sectional view taken on line 8—8.

Fig. 9 is a front view of a further type of lens produced by my method.

Fig. 10 is a sectional view taken on line 10—10.

Fig. 11 is a sectional view taken on line 11—11.

Fig. 12 is a top plan view of the minor lens member used in the lens of Fig. 9.

Fig. 13 is a horizontal sectional view of same.

A preferred method and apparatus for practicing my invention is illustrated in the drawing wherein 15 indicates a lower, female mold having the curved surface 16. The upper mold 17 is also provided with a curved surface 18 on the face of which there is formed a recess 19. Formed integrally, or otherwise, in the mold 17 is a conduit 20 which is connected to a vacuum pump, not shown, so that the minor lens member 21 can be held in the recess 19 by means of a vacuum, as shown in Fig. 1. The lower mold 15 is also provided with a movable knock-out plunger 22 by means of which the fused blank can be ejected from the mold.

In practicing my invention, a major member of glass 23, of suitable size, is heated in a furnace until it is quite plastic so that the upper surface of the member 23 is fused and becomes bright and smooth. The minor lens member 21, formed of glass of a higher refractive index than the major member and having a polished surface 24, is then positioned in recess 19 where it is held by suction. The upper and lower molds are heated by suitable means and the minor lens member 21 is also heated sufficiently to prevent its cracking but not enough to destroy or deform the polished surface 24 on its under side. The plastic major member 23 is transferred to the heated lower mold 15 and the upper mold 17, carrying the minor lens member 21, is brought down into the lower mold thereby pressing the minor lens member into the plastic major lens member and simultaneously forming two curved surfaces on the major member. The vacuum is released, the upper mold is retracted and the fused blank is ejected by means of plunger 22 and placed in an annealing oven. The plunger or mold 17 may be operated by compressed air or any other suitable means.

After the blank has been removed from the mold it appears, in section, as shown in Fig. 3. Surfaces having the desired curvatures are then ground and polished on the blank so as to provide the finished lens as shown in Figs. 4 and 5. Since the top surface of the plastic major member 23 is smooth, the polished surface 24 of the minor member is pressed down against it and thereby forms its own seat in the plastic glass. This provides a lens having two different vision fields, one through the major lens for distant vision and one through the minor lens or segment for near vision or reading. It is obvious that the minor lens member 21 may have any desired outline or contour. Thus, for example, the minor lens may have an oval or elliptical shape as shown in Figs. 6–8.

In prescribing bifocal lenses, it is often necessary to make the reading segment or minor lens prismatic with the base of the prism positioned at a certain specified location, such as "base in" or "base out", for example. It is desirable that this prismatic effect should be provided in the reading segment only and not in the major member. Under the prior art practice it has been rather difficult to obtain the desired results. By means of my method and apparatus, however, I can readily and cheaply produce a fused multifocal lens having prism in the segment only and with the base of the prism positioned in any selected location. In order to produce such a lens, the minor lens member is ground so that it is prismatic, as shown at 21' for example. The base of the prism is positioned at the left side of the segment so that the finished lens will appear as shown in Figs. 9–11. The base of the prism can, of course, be positioned at any selected location on the minor lens member.

From the foregoing it will be obvious that I am able to attain the objects of my invention and provide an improved method and means for producing ophthalmic lenses. The under side of the minor lens member can be provided with a polished spherical, cylindrical or toric surface so that various sphero or sphero-cylinder powers can be readily obtained in the reading segment. By means of my method, fused multifocal lenses and blanks can be easily manufactured with a minimum amount of labor. Under the widely used methods of the prior art, a major member is first formed by pressing a piece of plastic glass to provide one or more curved surfaces. A countersink is then ground and polished on the major member and the prepared minor member fused into the countersink. Under my method the prepared minor lens member is fused onto the plastic major member and the major member is simultaneously provided with one or more curved surfaces. The curved surfaces which are molded on the major member are dependent, of course, upon the powers desired in the finished lens. The molded surfaces are chosen so that a minimum amount of grinding will be needed to provide a lens of the desired power. By means of my method, the minor lens member can be rendered prismatic with the base of the prism selectively positioned according to the particular prescription. Various types of optical glasses can be used for the major and minor lens members and the temperatures used will depend upon the particular kinds of glass used. Various modifications can obviously be made without departing from the spirit of my invention.

I claim:

1. Apparatus for making ophthalmic lenses comprising a bottom mold having a curved surface, a top mold having a curved surface, means on said top mold for holding a lens member adjacent to its curved surface and means for moving one of said molds towards the other.

2. Apparatus for making ophthalmic lenses comprising a bottom mold having a curved surface, a top mold having a curved surface, a recess in the surface of said top mold, means for holding a minor lens member in said recess and means for moving one of said molds towards the other.

3. Apparatus for making ophthalmic lenses comprising a bottom mold having a curved surface, a top mold having a curved surface, a recess in the surface of said top mold, vacuum means for holding a lens member in said recess, and means for moving one of said molds towards the other.

4. Apparatus for making ophthalmic lenses comprising a mold having a curved surface, a second mold having a curved surface, means on one of said molds for supporting a minor lens member, means on the other mold for supporting a major lens member, and means for moving one of said molds toward the other.

WILLIAM BAUSCH.